US011890775B2

(12) United States Patent
More et al.

(10) Patent No.: US 11,890,775 B2
(45) Date of Patent: *Feb. 6, 2024

(54) AUTOMATING THE PLANNING, ESTIMATING, AND IMPOSITIONING OF PRINTER ORDERS VIA MULTI-STEP CUTTING

(71) Applicant: Tilia Labs Inc, Ottawa (CA)

(72) Inventors: Scott Aaron More, Tokyo (JP); Sagen Alek de Jonge, Oakville (CA)

(73) Assignee: Tilia Labs Inc., Ottawa (CA)

( * ) Notice: Subject to any disclaimer, the term of this patent is extended or adjusted under 35 U.S.C. 154(b) by 38 days.

This patent is subject to a terminal disclaimer.

(21) Appl. No.: 17/899,058

(22) Filed: Aug. 30, 2022

(65) Prior Publication Data

US 2022/0410424 A1 Dec. 29, 2022

Related U.S. Application Data

(63) Continuation of application No. 17/074,298, filed on Oct. 19, 2020, now Pat. No. 11,440,210.

(51) Int. Cl.

| | |
|---|---|
| ***B26F 1/38*** | (2006.01) |
| ***B26D 5/34*** | (2006.01) |
| ***B26F 1/44*** | (2006.01) |

(52) U.S. Cl.

CPC .............. *B26F 1/3853* (2013.01); *B26D 5/34* (2013.01); *B26F 1/44* (2013.01)

(58) Field of Classification Search

CPC ...... B26F 1/3853; B26F 1/44; B26F 2210/02; B26D 5/34; G06F 3/125; G06F 3/1205; G06F 3/1256

(Continued)

(56) References Cited

U.S. PATENT DOCUMENTS

| | | | |
|---|---|---|---|
| 5,985,081 | A | 11/1999 | Reynolds |
| 7,016,068 | B1 | 3/2006 | Gnocato et al. |

(Continued)

FOREIGN PATENT DOCUMENTS

| | | | |
|---|---|---|---|
| EP | 2098368 | B1 | 11/2012 |
| EP | 2958008 | A1 | 12/2015 |

(Continued)

OTHER PUBLICATIONS

Entire patent prosecution history of U.S. Appl. No. 17/074,298, filed Oct. 19, 2020, entitled, "Automating the Planning, Estimating, and Impositioning of Printer Orders via Multi-Step Cutting That Involve Die Cutting."

(Continued)

*Primary Examiner* — Omar Flores Sanchez
(74) *Attorney, Agent, or Firm* — RatnerPrestia

(57) ABSTRACT

Disclosed herein is a planning and impositioning technique for industrial printing orders that evaluates and ranks potential planning and impositioning schemes for a given print order based on available printing apparatus, media, and die-cutter specifications. The printing schemes make use non-die cutter operations to subdivide a media sheet, followed by a series of die-cutter operations each subdivision to take advantage of industrial printer efficiency. This printing operation is enabled by planning and impositioning phases that generate print instructions allows a change in media size from printer apparatus to dies. Specifically, during the planning phase of the print order, a printer apparatus and a die or set of dies are selected where the media size used by the printer apparatus is larger than the die(s) is/are designed for.

28 Claims, 14 Drawing Sheets

(58) Field of Classification Search
USPC .......................................................... 83/453
See application file for complete search history.

(56) References Cited

U.S. PATENT DOCUMENTS

| | | | | |
|---|---|---|---|---|
| 7,171,901 | B2 | 2/2007 | Salvestro | |
| 8,219,227 | B2 | 7/2012 | Paltiel et al. | |
| 8,353,591 | B2 | 1/2013 | Isowa et al. | |
| 9,663,261 | B2 | 5/2017 | Azad et al. | |
| 9,727,051 | B2 | 8/2017 | Henning et al. | |
| 9,754,196 | B2 | 9/2017 | Elchlepp et al. | |
| 9,917,977 | B1 | 3/2018 | Basu et al. | |
| 10,078,477 | B2 | 9/2018 | Mitsubori | |
| 10,353,652 | B2 | 7/2019 | Herrmann et al. | |
| 11,003,406 | B2 | 5/2021 | Christy et al. | |
| 11,093,186 | B2 | 8/2021 | Sloan et al. | |
| 11,210,043 | B1 | 12/2021 | de Jonge et al. | |
| 11,263,502 | B1 | 3/2022 | de Jonge et al. | |
| 2005/0166498 | A1 * | 8/2005 | Oakey | B26F 1/44 52/273 |
| 2008/0060535 | A1 | 3/2008 | Edwards et al. | |
| 2011/0147445 | A1 | 6/2011 | Horn et al. | |
| 2014/0033886 | A1 * | 2/2014 | Hoover | B26D 5/00 83/365 |
| 2015/0363715 | A1 | 12/2015 | Reismueller et al. | |
| 2017/0015014 | A1 | 1/2017 | Hoover et al. | |
| 2019/0016081 | A1 | 1/2019 | Widner et al. | |
| 2019/0018628 | A1 | 1/2019 | Sloan et al. | |
| 2020/0081667 | A1 | 3/2020 | Nishio | |
| 2021/0350037 | A1 | 11/2021 | Plettinck et al. | |

FOREIGN PATENT DOCUMENTS

| | | | |
|---|---|---|---|
| EP | 2960058 | A1 | 12/2015 |
| EP | 3218268 | A1 | 9/2017 |
| EP | 3252593 | A1 | 12/2017 |
| JP | 6623938 | B2 | 12/2019 |
| WO | 2016074065 | A1 | 5/2016 |

OTHER PUBLICATIONS

Entire patent prosecution history of U.S. Appl. No. 17/074,257, filed Oct. 19, 2020, entitled, “Printer to Die Cutter Media Size Shift.”

Entire patent prosecution history of U.S. Appl. No. 17/084,617, filed Oct. 19, 2020 entitled, “Method for Multifunctional Graphical User Interface File Indicia Movement, and System, Terminal and Computer Readable Media for the Same.”

* cited by examiner

AUTOMATING THE PLANNING, ESTIMATING, AND IMPOSITIONING OF PRINTER ORDERS VIA MULTI-STEP CUTTING

CROSS-REFERENCE TO RELATED APPLICATIONS

This Application is a continuation application of U.S. application Ser. No. 17/074,298, filed Oct. 19, 2020, the contents of which are incorporated herein by reference in their entireties for all purposes.

TECHNICAL FIELD

The present disclosure is directed to printing industry arts and more particularly to measurements between industrial printers and die-cutters.

BACKGROUND

In performing industrial printing, media is often printed on, then cut via dies to shape/size accordingly to predetermined measurements. Prior to executing the printing and cutting process, a given print order is planned out and impositioned to provide the necessary measurements to the printer and die-cutter.

Die cutting is a common technique in the printer industry using a pre-built cutting die to cut out one or more items on a sheet or roll. Die making can be time consuming and expensive; thus, industrial printers typically store their existing dies on premises for later reuse. The lifetime of a die varies greatly by the type and quality of a die. Dies can last anywhere from a few hundred to several million cuts.

During the planning stage, one or more print orders assigned to a set of equipment/apparatus that actually produces the print order within the manufacturing facility. At a high level, print orders are assigned to a media (sheet or roll size) and a set of devices and/or processes that will produce the orders such as printing press, cutting devices, and other finishing devices.

During the impositioning stage, the items within the print order are digitally or manually laid out upon a given media size. During this step, exact item positions and rotations are determined for each item. Printing marks that are needed by a device or an operator during production are typically also added at this step.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Aspects of the present disclosure are directed to planning and impositioning print orders in a manner that allows a downshift in apparatus media from printers to die-cutters. Specifically, during the planning phase of the print order, a printer apparatus and a die-cutter or set of die cutters are selected where the media size used by the printer apparatus is larger than the die-cutter is designed for. The media is subdivided in to multiple sections that are each separated via a non-die cutting device. The print process therefore involves printing numerous objects on the media, subdividing the media, then die cutting each subdivision.

When performed via software, planning and imposition are processing intensive steps. Industrial printers tend to have multiple sets of dies and printing apparatus available in order to flexibly meet a given print order. When an industrial printer receives an order, they execute planning software. The planning software analyzes the available materials, media, and apparatus and plots out one or more potential plans along with an estimated cost of each plan based on the known costs of man-hours and materials. Prior to this disclosure, planning-software imposed restrictions pertaining to compatibility of media between multiple steps of the job (e.g., printing and die-cutting). In some cases, for large orders, it is more efficient to fill those orders using a large print apparatus. Notably, industrial printers tend to a have a limited supply of dies, or their dies are too small to handle the larger media. However, when the planning further incorporates the potential for subdivision of media via a non-die cutting device, new combinations of printer and die-cutter may result from the planning phase that improve overall efficiency.

In the impositioning phase, identified dies are laid out across the media and subdivision cuts are positioned in a manner that enables a downshift from a larger printer to a smaller die-cutter. The sub-division cuts are performed by a non-die cutting device. Examples of die-based cutting are flatbed die cutters, rotary die cutters, and high-die cutters. Examples of non-die-based cutting are guillotine cutters, digital cutting tables, laser cutters, X/Y cutters, and roll slitters.

Through the inclusion of media-mismatch apparatus pairings and impositioned subdivisions of the media, efficiency completing a given print job is improved.

Figure 1:
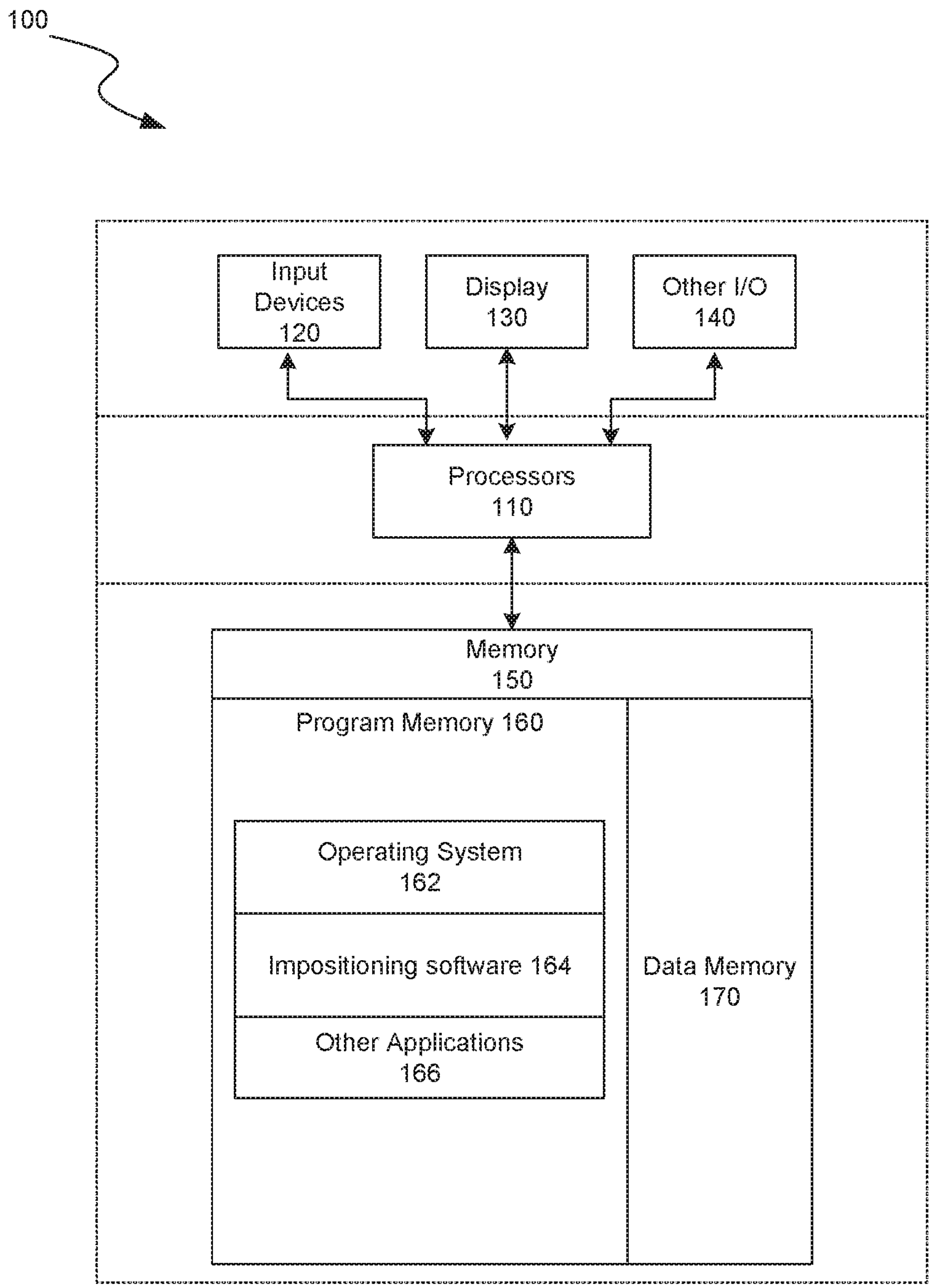
FIG. 1 is a block diagram illustrating an overview of devices on which some implementations can operate.

Several implementations are discussed below in more detail in reference to the figures. FIG. 1 is a block diagram illustrating an overview of devices on which some implementations of the disclosed technology can operate. The devices can comprise hardware components of a device 100 that perform planning and impositioning of a print order. Device 100 can include one or more input devices 120 that provide input to the Processor(s) 110 (e.g. CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, impositioning software 164, and other application programs 166. Memory 150 can also include data memory 170, e.g., specifications of available printing equipment, digital models of dies, costs associated with running available equipment, costs of materials, estimated man-hours associated with pre-identified tasks, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
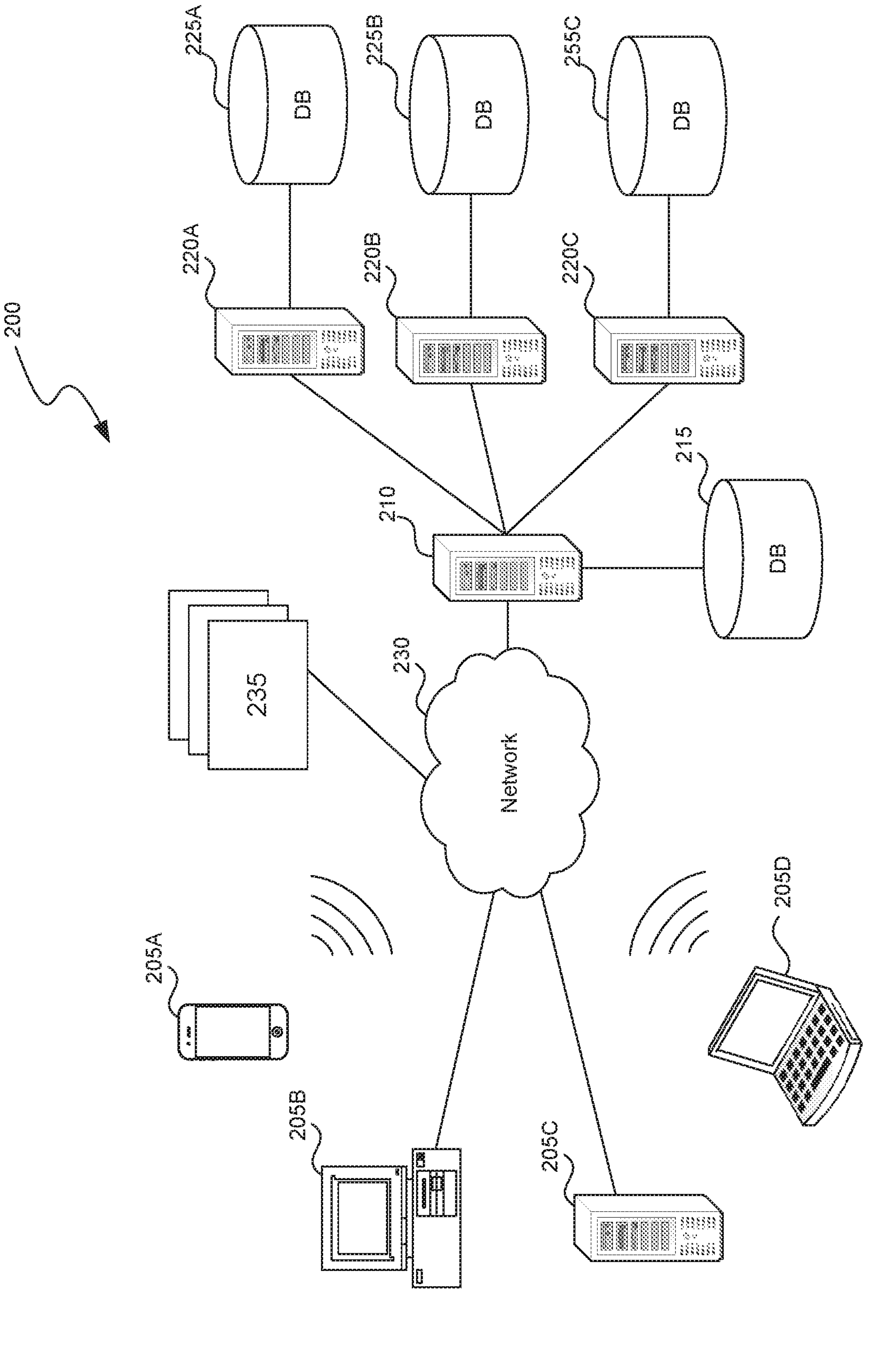
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as specifications of available printing equipment, digital models of dies, costs associated with running available equipment, costs of materials, estimated man-hours associated with pre-identified tasks. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN) but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Printing process equipment 235 communicates with the network and receives print job instructions from imposition software. The printing processing equipment may include an array of various machines that are selected on a job-to-job basis based on planning software.

Figure 3:
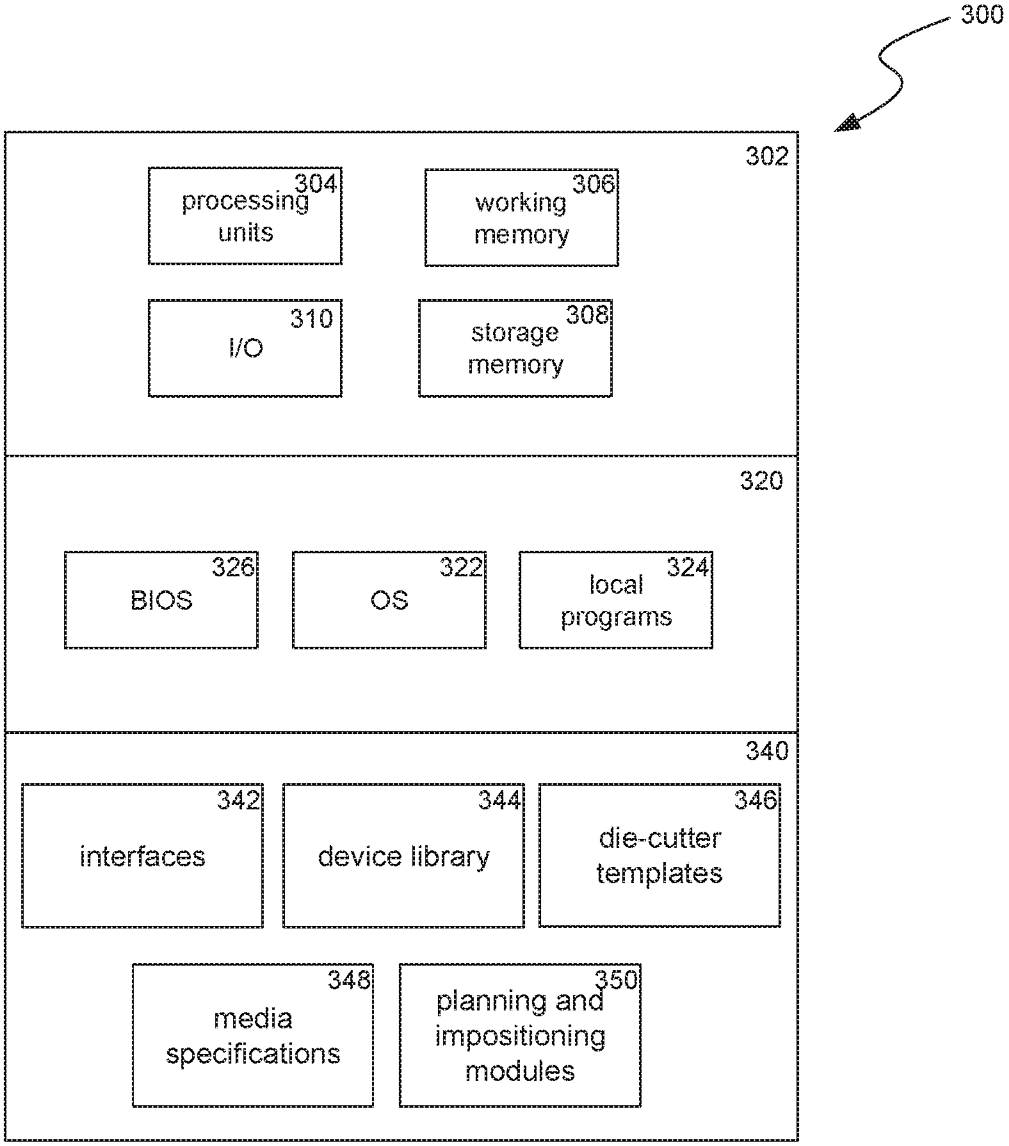
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include a devices library 344, die-cutter templates 346, media specifications 348, planning and impositioning modules 350 and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

the device library 344 includes printing and cutting devices specifications. The printing specification includes a set of details for each printer. Example details include inks available, current ink levels, efficiency of meeting a queried spot color, supported media sizes, rate of production, error/waste rate, and associated administrator operating procedure time requirements. The cutting device specifications describe a requisite margin and a list of supported media sizes (in some embodiments, only a single media size is compatible with a given die-cutter), as well as their respective constraints and optionally costs/speeds. The speed may be derived from a certain rate of manufacture based on the number of objects within a given die-cutter (e.g., a 3-up die cuts products at 3 times the rate of a corresponding 1-up die). From the rate of manufacture, the planning and impositioning modules 350 may derive a relative cost of operation of each die.

The device library may also include specifications for non-die cutting devices. Examples of non-die-based cutting are guillotine cutters, digital cutting tables, laser cutters, roll slitters, X/Y cutters. The specifications describe media sizes and speed of operation. Each of the above details may be converted into a measurable unit relative to cost.

die-cutter templates 346 include each die available to the industrial printer. In many cases the die templates are stored on a per-client basis. Included as metadata with the stored die-cutter templates is the style of die-cutter. Examples of die-based cutting devices are flatbed die cutters, rotary die cutters, and high-die cutters. Each template or associated specification includes a requisite margin and a list of supported media sizes (in some embodiments, only a single media size is compatible with a given die-cutter).

media specifications 348 describe all available media rolls or sheets available. Examples of descriptive elements are the size and shape of the media, thickness, cost, and/or types of inks that may be applied.

The planning and impositioning modules 350 use the above elements 344, 346, 348 as underlying databases that inform planning and impositioning schemes for a proposed print order. A proposed print order includes a specified number of a given print product or set of print products. The planning and impositioning modules 350 apply the underlaying databases to arrive at a number of planning and impositioning solutions for the print order. The solutions may prioritize specific attributes (e.g., overall cost, speed, or amount of waste of completing the print order) with a given combination of the underlying printer/die-cutters/media.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
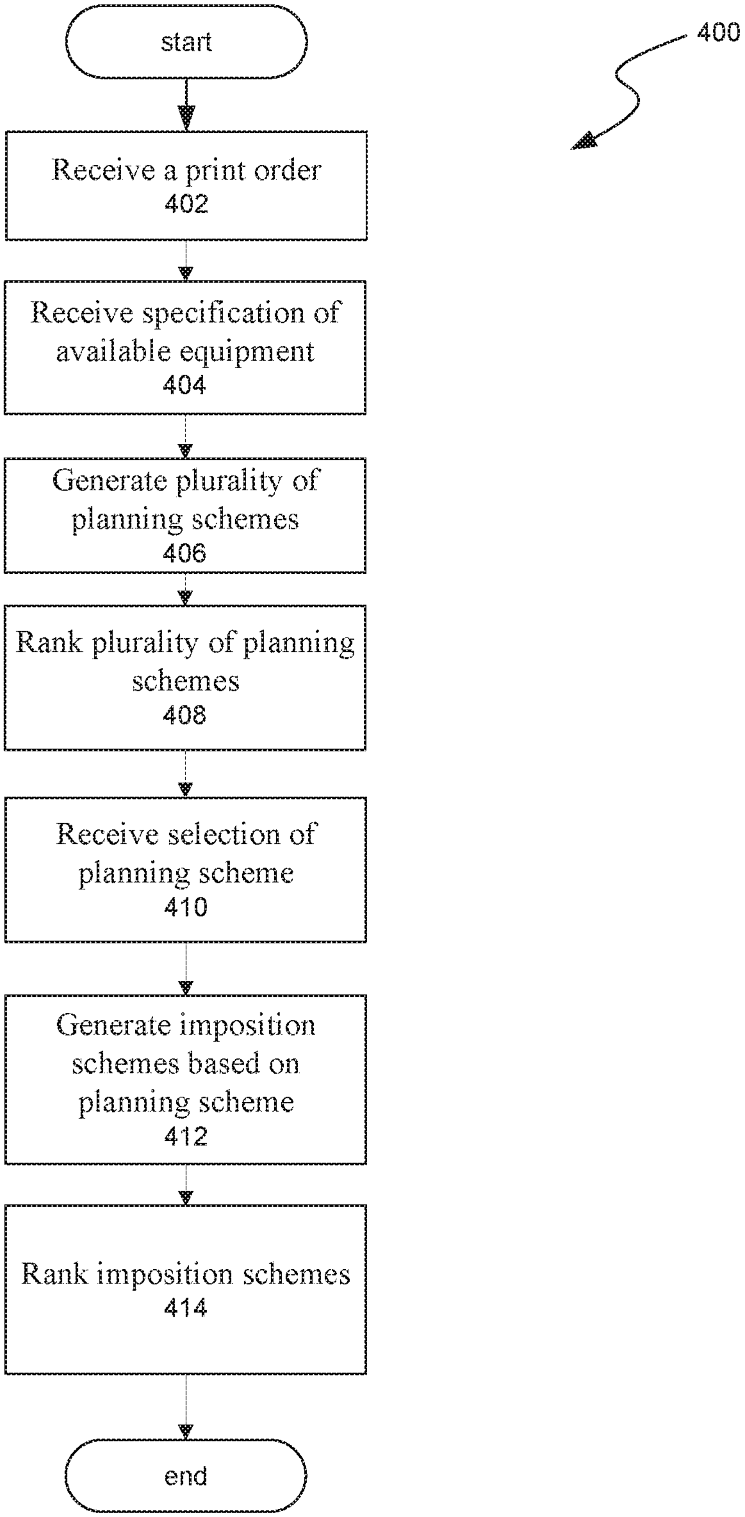
FIG. 4 is a flow diagram illustrating a process used in some implementations for generating planning and imposition schemes.

FIG. 4 is a flow diagram illustrating a process 400 used in some implementations for generating planning and imposition schemes. In some implementations, process 400 can be performed "just in time," e.g. as a response to a user request for a list of CETs. In some implementations, process 400 can be performed ahead of time e.g. on a schedule or when servers are determined to have available processing capacity.

In past platforms, industrial printers performing estimation of costs for a given print order often use formulas or spreadsheets to roughly estimate how much jobs will cost. Other manufacturers will use software systems that do not have knowledge of all cutting processes to help produce rough estimates. In that case, multipliers (i.e. "fudge factor") can be applied to the cutting times and costs to try to account for the extra steps involved. Although unlikely due to time constraints, the planning methods described below could also be used for estimation.

The limitations of estimation are based on the limitations of planning. Specifically, prior automated platforms limit the potential planning schemes to fewer operations that are actually available to industrial printers. Where initial planning of a job does not include steps that may have been physically possible but were, never the less, not contemplated, an industrial printer's thinking is limited only to those lines of thought that are made available during the planning stage. More automated planning software can include non-die cutting processes as a part of the planning phase, thereby expanding the potential considerations made during the estimation, planning and imposition phases.

Similarly, without planning data that accounts for all steps, automated device control does not function properly. Some software systems can generate cutting data for the initial cutting process that cuts down sheet stacks into the individual dies. For guillotine cutters this can be in the form of CIP4 or JDF cutting data. Sometimes special printing marks need to be added to the layout for cutting devices to scan (e.g. barcodes) or for cutting device operators (e.g. registration marks). For the initial cutting process, the imposition software might be able to add these marks automatically.

In step 402, an industrial printing platform receives a print order including a requisite number of print products. The print products may each vary in type/color/style (e.g., 1000 of a first style, 2000 of a second style, 1000 of the second style in an alternate color). In some embodiments, multiple orders (from potentially multiple clients) are combined. Combined orders are compared in the alternative for efficiency to implementing the respective orders individually as described below.

In step 404, the platform loads a specification of available equipment, the specification including characteristics of available die-cutters associated with the print products in the print order and characteristics of available printing apparatus. The specification indicates relative media sheets/rolls that are compatible with each die-cutter and printer. For example, a high-die cutter that is intended to cut business/playing cards is compatible with a significantly smaller media size than a large industrial printer.

Each die has a specific size and number of print products produced via a cutting operation. Further the specification describes any additional spacing margins surrounding the dies (e.g. "lips" or "trims") that are needed by the die cutter to perform processing. The specification may also include size information associated with non-die cutting devices. The specification further includes media dimensions representing the width and height (and sometimes thickness) of the potential media that print products are to be placed on.

In step 406, the platform generates a plurality of planning schemes that each combine a printing apparatus and a die-cutter from the available equipment. Based on the print order, there may be multiple dies included in each planning scheme. In some embodiments, the planning scheme further includes a media type. At least one of the planning schemes will make use of a combination of a printing apparatus and a die-cutter (or set of die-cutters) that are of a mismatch media size (the printer will correspond to larger media than the die-cutter).

The mismatch is accounted for with a planned non-die cutter cutting operation. Examples of non-die-based cutting are guillotine cutters, digital cutting tables, laser cutters, roll slitters, X/Y cutters, or other known equivalents. Not all non-die cutter devices are available for all media types or printer apparatus types. The relevance of a given style of non-die cutting device is based on a current print order.

The planned non-die cutter cutting operation is designed to create a number of subdivisions of an exemplar media sheet/roll section. Each subdivision corresponds to a given die-cutter cutting operation. Use of planned subdivisions enables the user of higher efficiency printing apparatuses despite limited availability of die cutters. An example of when this occurs is when a given client of an industrial printer seeks to scale up production quickly, or a one-off large order where is does not make sense to manufacture new, larger dies to compensate. An alternate example is where numerous print products are requested and while efficient dies are available, it is, never the less, more efficient to print all of the print products during a single printing run, and then perform cutting operations.

The planning schemes include selections of both candidate die and item quantities. Quantity selections can be incremental or chosen based on meta heuristics, constraint programming, or machine learning algorithms. The quantities selected are tested for feasibility in production. Testing could involve a simple check on the remaining available area on the media required or may employ techniques that attempt to place the selected quantities of dies and non-die cut items within the media dimensions while avoiding overlapping of die margins and items, such as bin packing or other nesting algorithms or heuristics.

Each of the planning schemes has an associated set of statistics (e.g., predicted cost, predicted waste, predicted required overrun, etc.). In some embodiments, A stopping criteria is applied if the generation of the planning schemes reaches a threshold time or target quality (e.g., waste below a certain percentage, cost efficiency, etc.).

In step 408, the platform ranks the plurality of planning schemes based on a predicted efficiency of a prioritization focus (e.g., any one of the statistics associated with the planning schemes). The statistics for each planning scheme are based on the specification of available equipment and respective printing apparatus and die-cutters. The ranking may be based on a predicted time expenditure based on historical data included in the specification of available equipment. In step 410, a user or automated process selects one of the planning schemes. The automated process selects based on some pre-defined criteria. Examples of automation include hot folder scripts and web service clients.

In step 412, the platform generates imposition schemes. In some embodiments, there may only be a single imposition scheme. The imposition schemes report all cutting processes and devices and each include a packing alignment of the requisite number of print products to an exemplar media sheet (or length of media roll). Imposition schemes include the specific numbers of the given dies and non-die cut items that are to be placed within the media dimensions. Presuming a plan using a mismatch of printer to die-cutter size was selected, each of the imposition schemes will include media subdivisions plotted out to the exemplar media sheet, wherein each media subdivision of each of the plurality of imposition schemes includes a die-cutting operation instruction.

The imposition schemes automatically add margins to dies and treating them as cut lines. In print orders that include multiple print objects, the schemes further place multiple dies on layouts together while maintaining individual print object positions. Where there are multiple print objects, or combined print orders, the imposition scheme may automatically assign job orders to individual die positions in dies on layouts that contain other print objects.

In some embodiments, imposition schemes may be saved in part of in whole to generate new imposition templates. The imposition templates are combinations of existing dies and a non-die cutting operation that subdivides the media. These can be called up during planning process and reused to improve efficiency of the generation of planning schemes. When a pseudo-die is generated, metadata relating to costs of the employing the pseudo-die is auto-populated in the specification (e.g., based on the sum of the parts).

In step 414, the imposition schemes are ranked by the platform based on a predicted efficiency.

Figure 5:
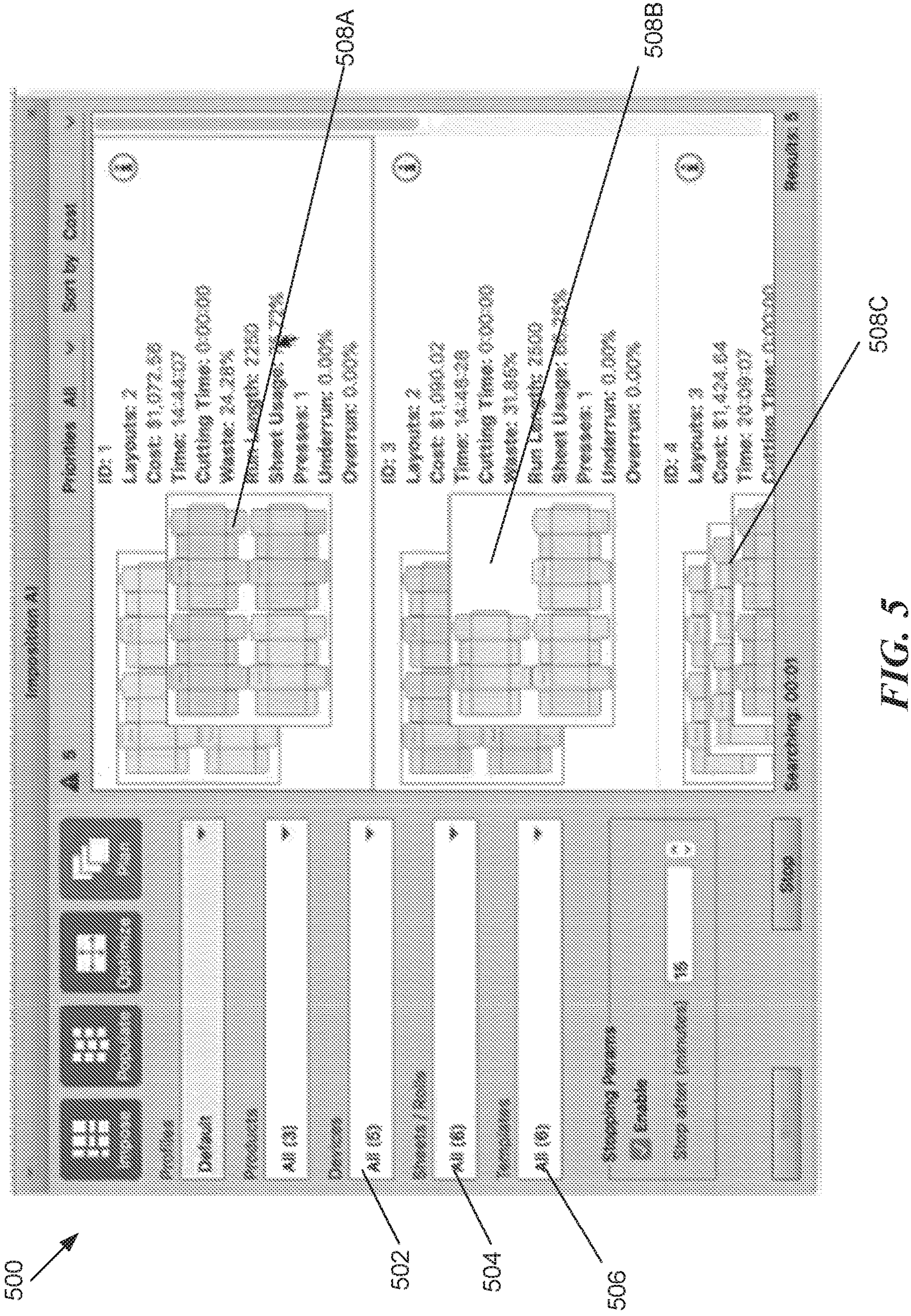
FIG. 5 is a screen shot illustrating a planning scheme user interface.

FIG. 5 is a screen shot illustrating a planning scheme user interface 500. The planning interface includes drop down menus where a user may select various scheme configuration options including the printing apparatus available 502, the media available 504, and the die-cutter templates available 506.

From the available equipment, the platform assembles a set of planning schemes 508A-C. The planning schemes 508A-C each describe the potential cost of following each respective plan in completing the print order. The plans include a number of media sheets/length of roll, a predicted amount of waste, a predicted overall cost, a length of job completion, and a predicted time spent on cutting subdivisions of media sheets. In some embodiments, the print order will call for multiple types/colors of print products and these aspects are factored into the resultant planning scheme.

Notably, the user interface is for assistance to human users. In some embodiments, the process is automated and significantly less interface controls are employed. For example, in an automated case, device, media, and template selection occur in a web service, XML or other automated way and results are returned in a digital format like JSON or XML. Those results are then reported and/or applied.

Figure 6:
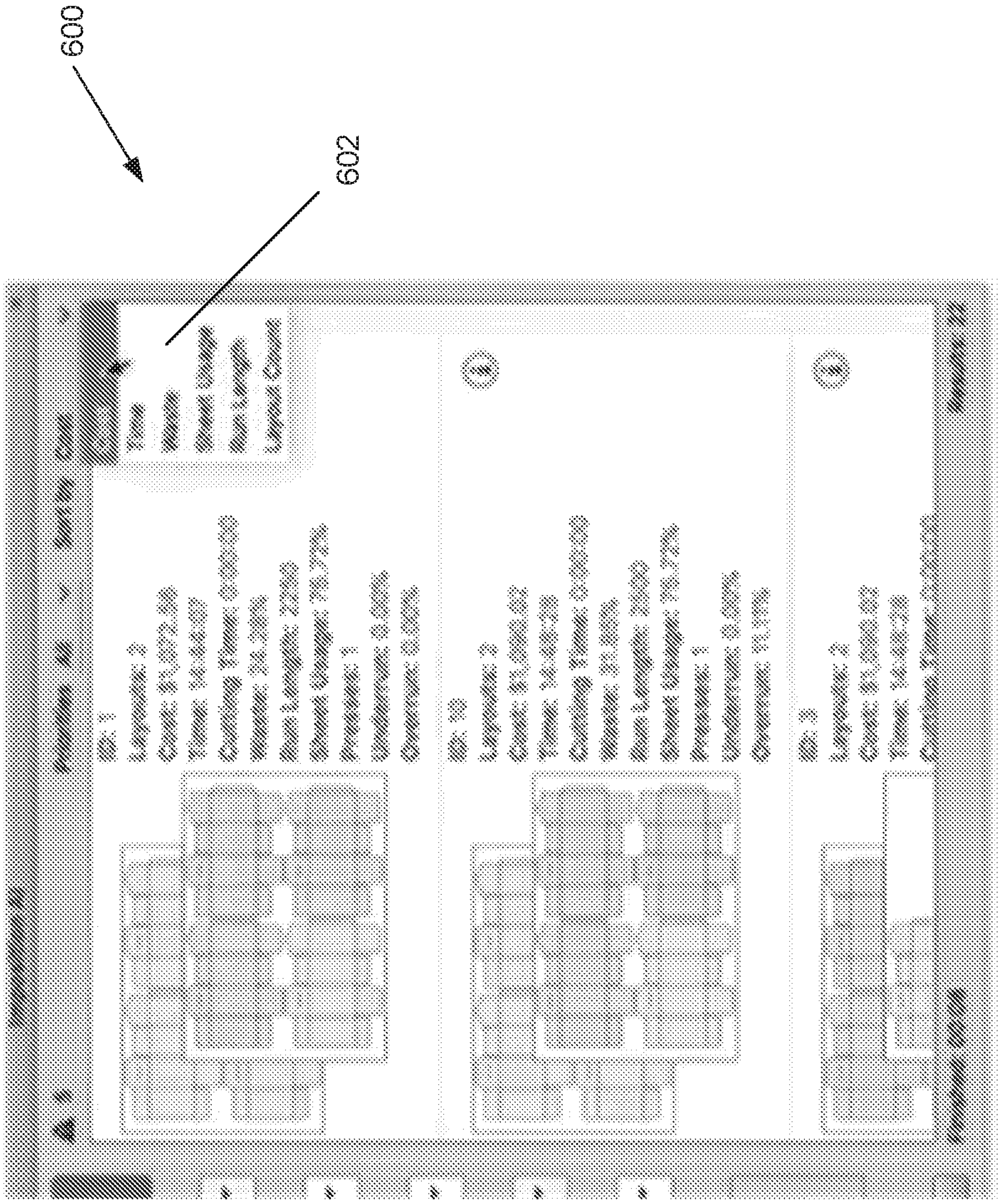
FIG. 6 is a screen shot illustrating a sorting rank feature of a planning scheme user interface.

FIG. 6 is a screen shot illustrating a sorting rank feature of a planning scheme user interface 600. Once the planning module has generated a set of planning schemes, those schemes are ranked and sorted for user selection. The sorting rank is controlled via a sorting rank feature 602 (e.g. cost, time, waste, sheet usage, run length, and layout count, as illustrated in FIG. 6) that enables a user to elect a particular prioritization focus (e.g., cost or run time). The prioritization focus orders the planning scheme by that focus. The sorting ranks enable a user to adequately quote a job.

Figure 7A:
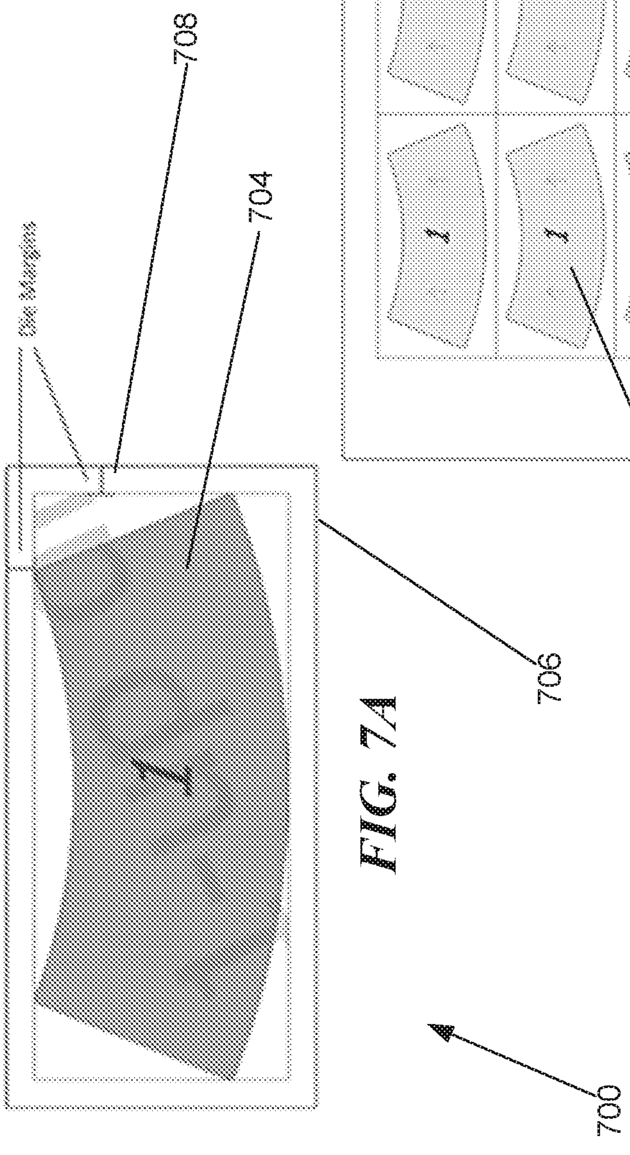
FIGS. 7A and 7B are illustrations of a first embodiment of a die and an imposition layout using subdivisions respectively.
Figure 7B:
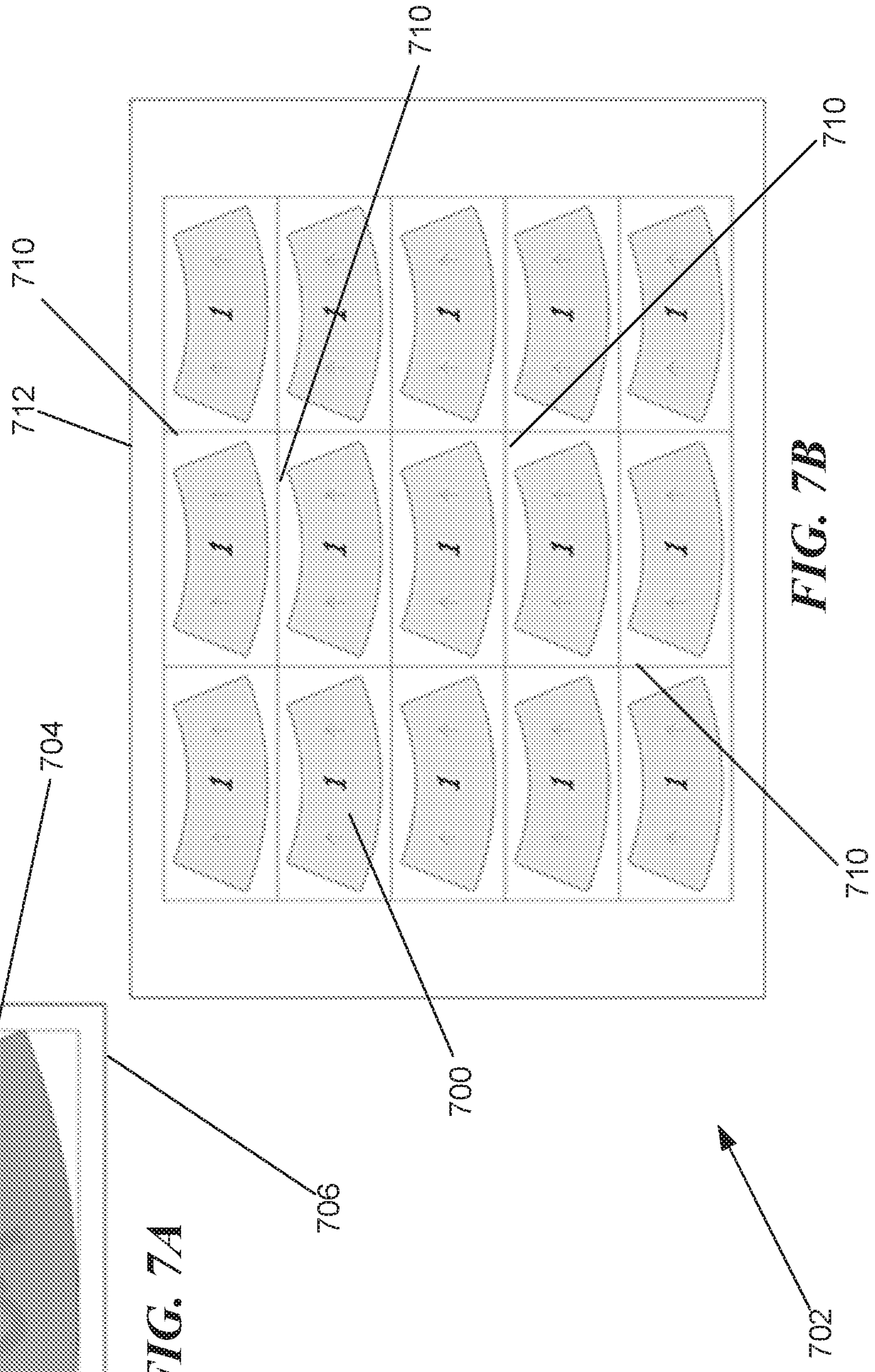

FIGS. 7A and 7B are illustrations of a first embodiment of a die 700 and an imposition layout using subdivisions 702 respectively. The pictured die cut 704 is of a curved rectangle—perhaps a label for a wine bottle. The die 700 generates a single label per cut (or a single column of labels). The die 700 corresponds to an expected media size 706. The expected media size 706 is the die cut 704 in addition to a margin 708 that is required by the die 700.

The imposition layout 702 positions fifteen separate subdivisions that are first cut using a non-die cutting device. The subdivision cuts 710 are indicated in the imposition scheme 702. Before die cutting, each of the subdivision cuts 710 are performed, and then the die-cutter process is performed. Notably, the actual media size 712 is significantly larger than the expected media size 706. The size mismatch enables the print run to be fifteen times shorter (give or take overrun variance) than if media that matched the expected size was used.

Figure 8A:
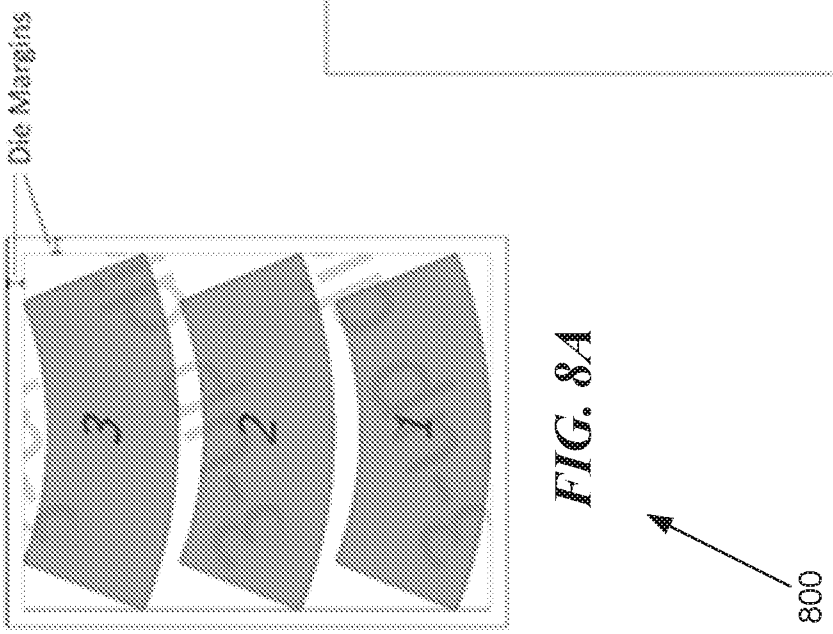
FIGS. 8A and 8B are illustrations of a second embodiment of a die and an imposition layout using subdivisions respectively.
Figure 8B:
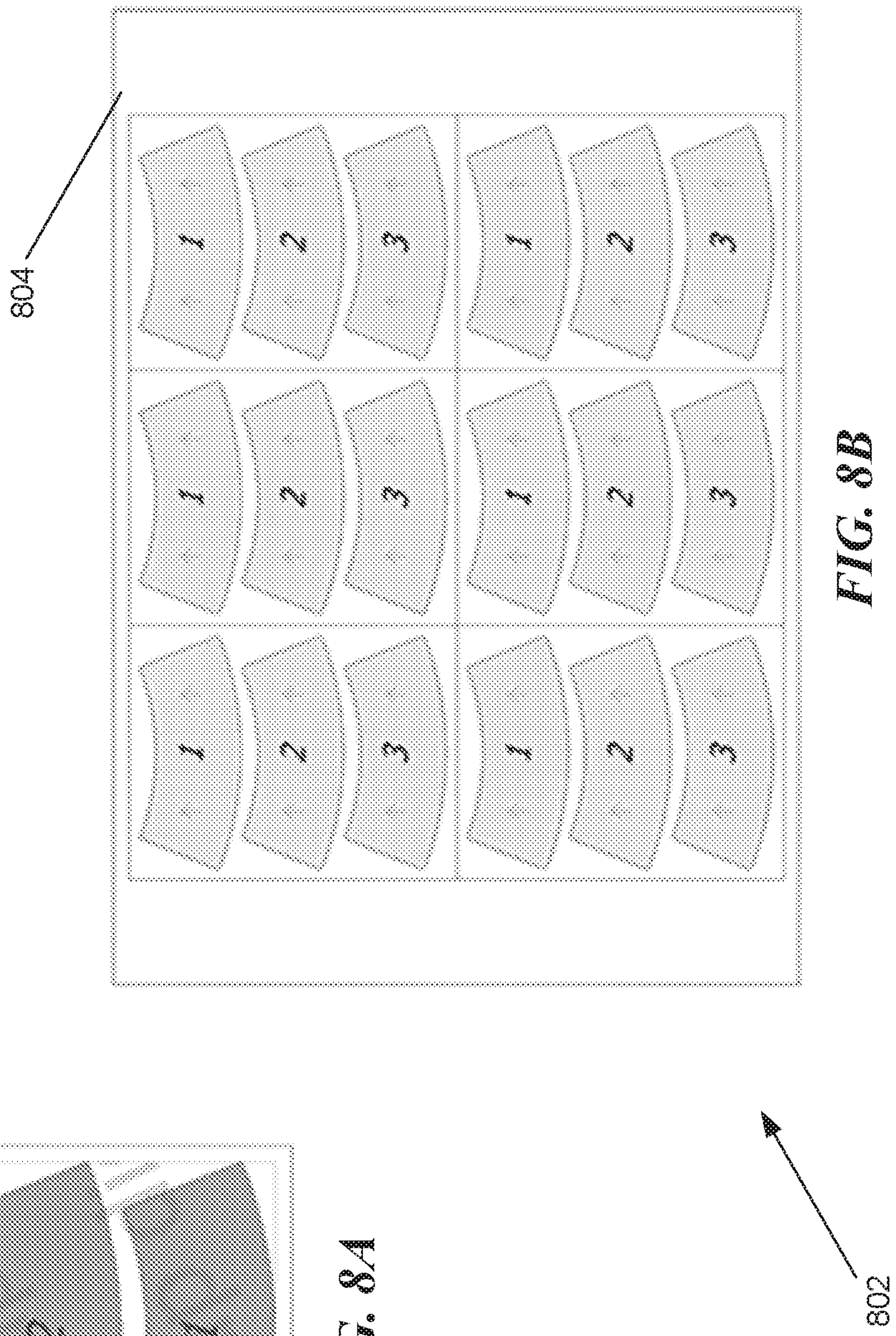

FIGS. 8A and 8B are illustrations of a second embodiment of a die 800 and an imposition layout using subdivisions 802 respectively. FIG. 8 is similar to FIG. 7, which the exception of making use of a 3-up die instead of a 1-up die. In this embodiment, the different die 800 packs differently in the exemplar media sheet 804, and now produces eighteen labels per sheet and has fewer subdivision cuts.

Figure 9A:
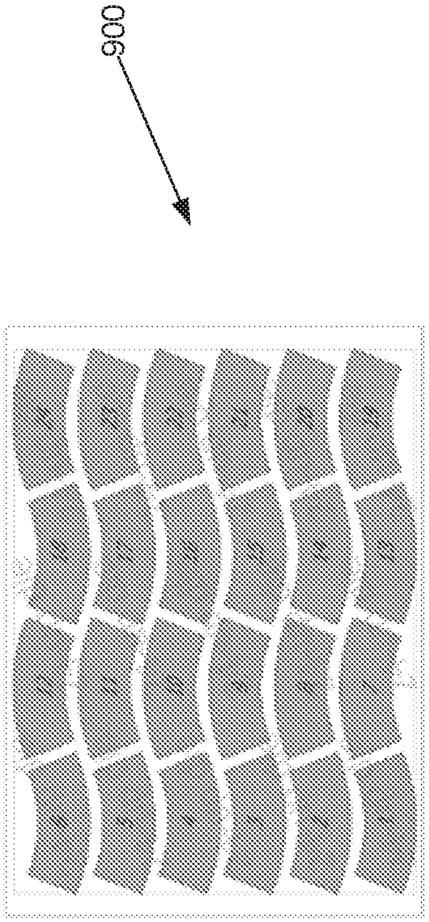
FIGS. 9A and 9B are illustrations of a die and an imposition layout with asymmetric subdivisions.
Figure 9B:
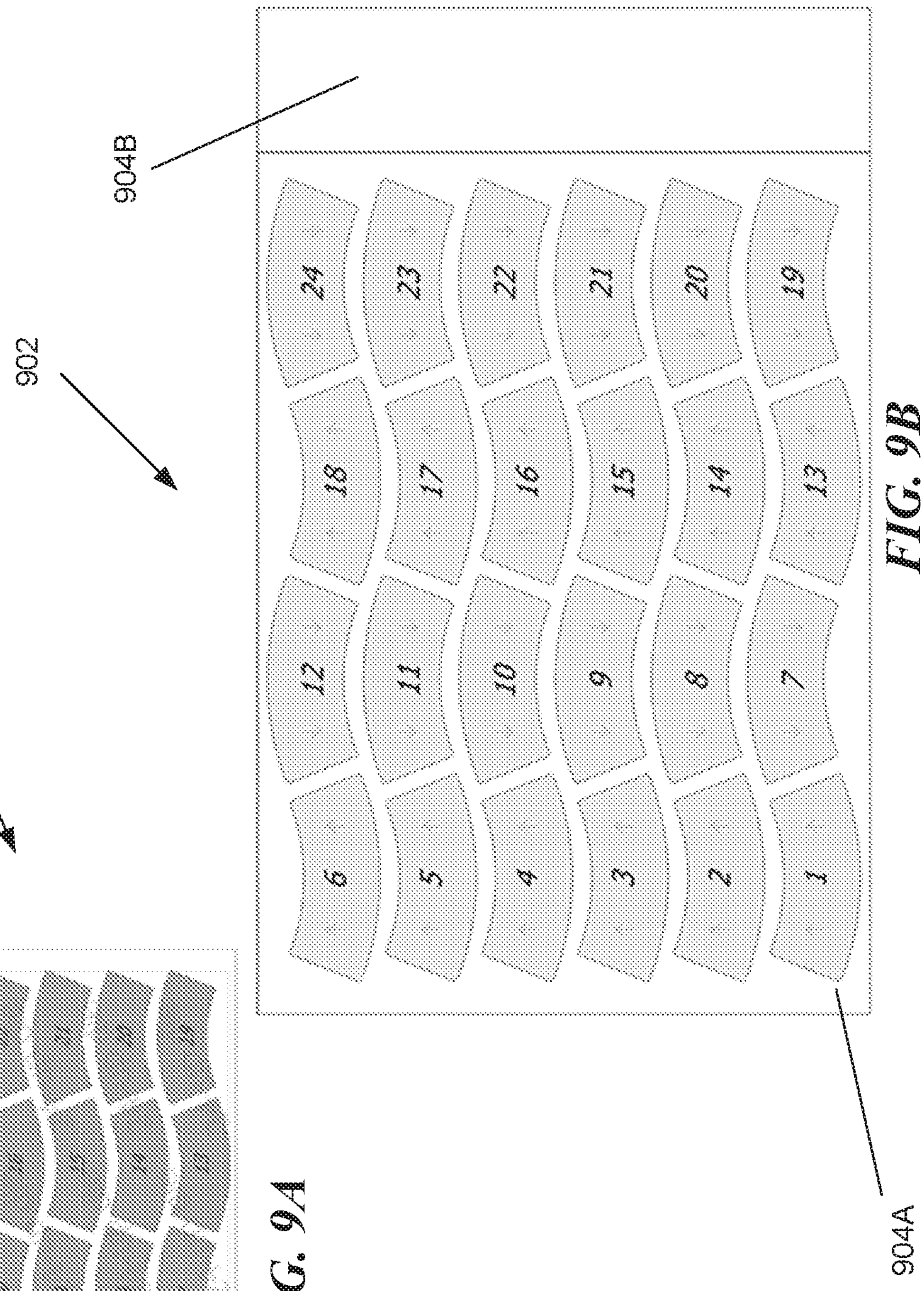

FIGS. 9A and 9B are illustrations of a die 900 and an imposition layout with asymmetric subdivisions 902. The pictured imposition layout 902 only includes two subdivisions 904A, B and one non-die cutting device cut. The subdivisions 904A, B are asymmetric and one 904B is waste media. The pictures imposition scheme 902 would be used when media is slightly too large for the die 900. The second subdivision 904B is cut off before the first subdivision 900A is run through the die cutter.

Figure 10A:
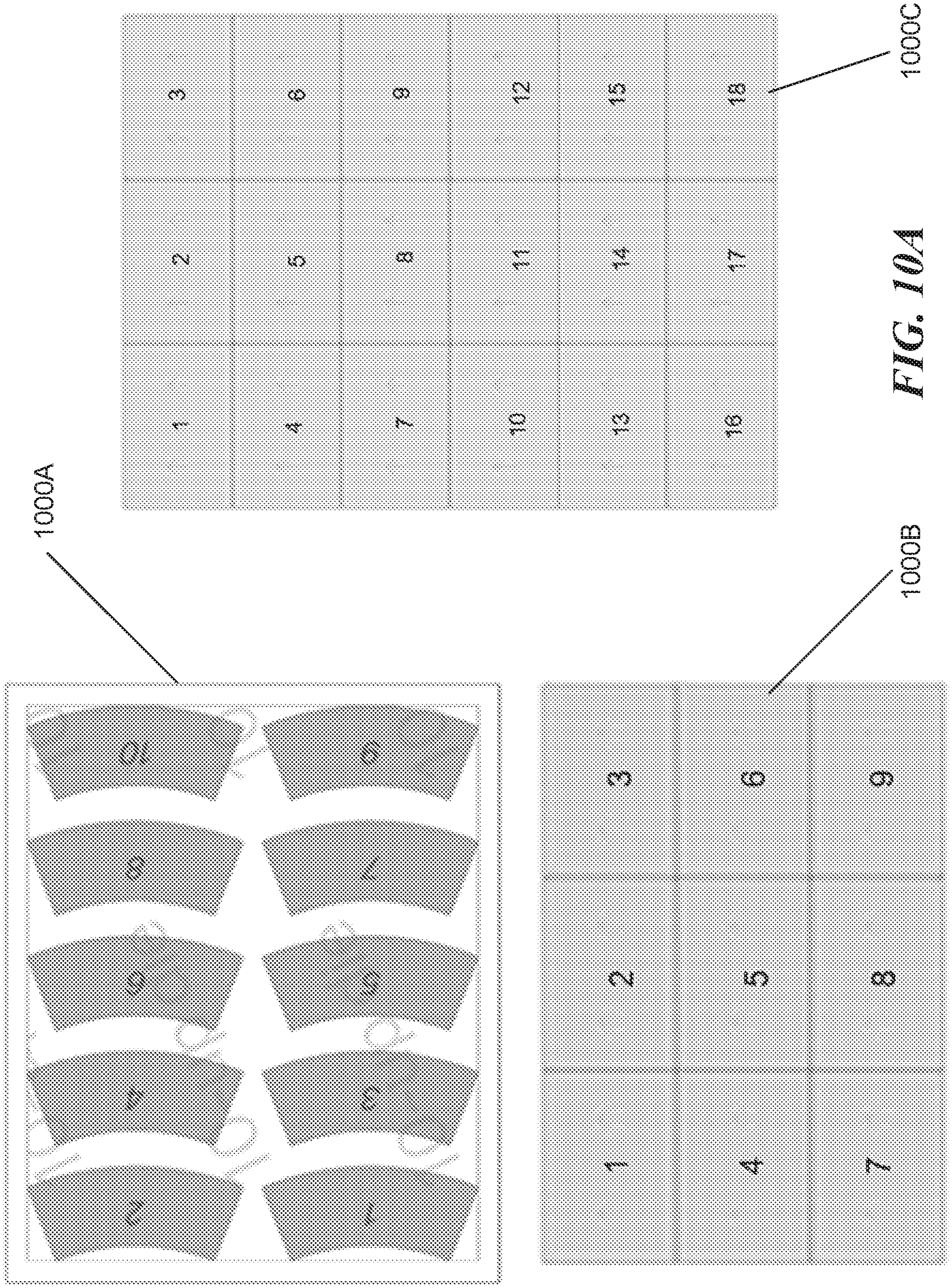
FIG. 10A includes a set of illustrations of multiple dies associated with a single print order.

FIG. 10A includes a set of illustrations of multiple dies 1000A, B, C associated with a single print order. In some circumstances, a client simultaneously orders multiple print products, multiple orders are combined, or the number of print products requested is such that it is most efficient to combine multiple dies for the same print product that cut at different sizes (e.g., a corresponding 1-up and 3-up die as in FIGS. 7 and 8).

Figure 10B:
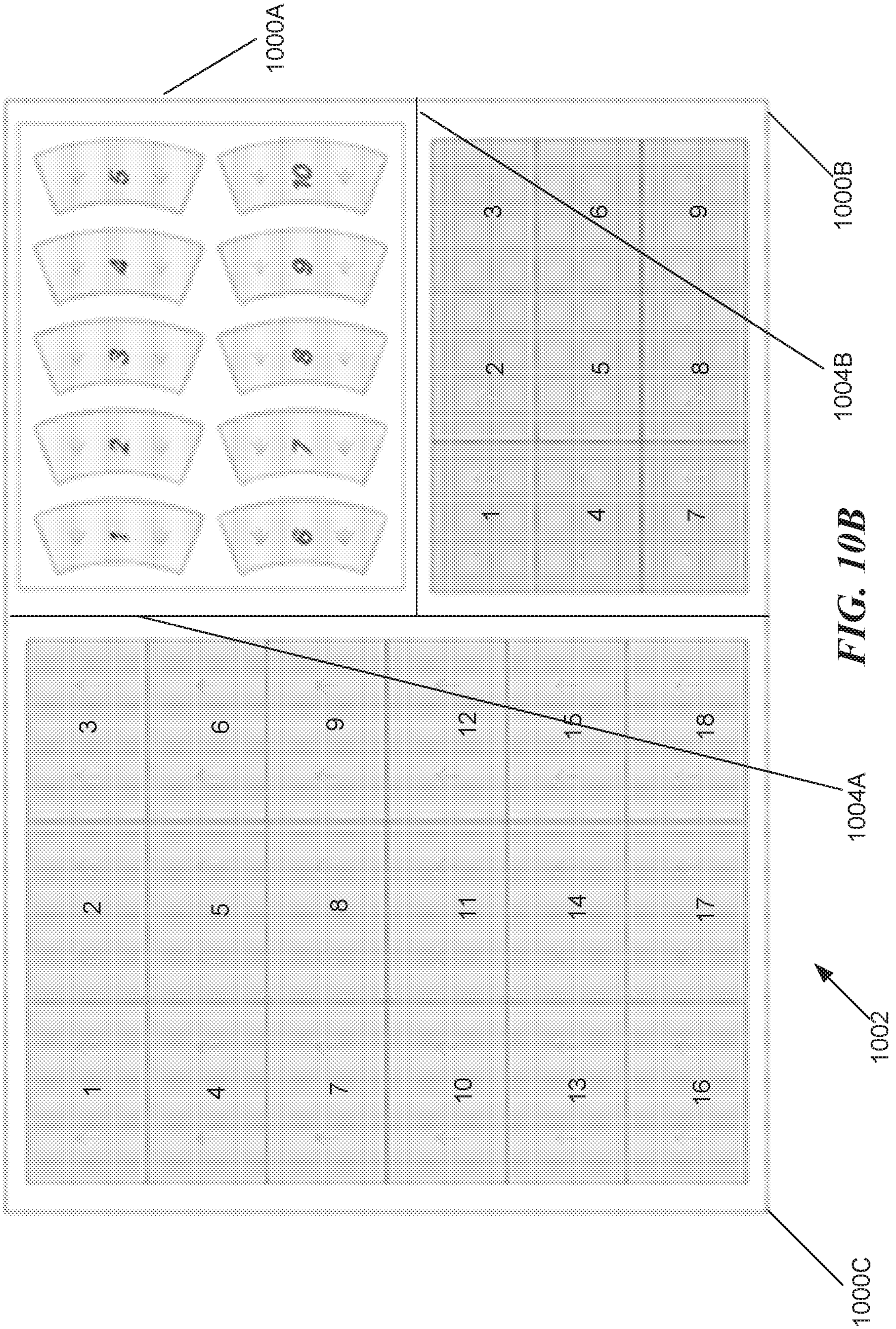
FIG. 10B is an illustration of an imposition layout making use of multiple dies in asymmetric subdivisions.

FIG. 10B is an illustration of an imposition layout 1002 making use of multiple dies 1000A-C in asymmetric subdivisions. The 10-up die 1000A is placed on a bigger sized layout, along with several rectangular items 1000B, C. A layout like this includes two separate subdivision cutting operations. In some embodiments, the rectangular items 1000B, C may be cut further with a non-die cutting device (e.g., a guillotine cutter or roll slitter). The remaining die section is then fed into the die cutting device to get further cut down into individual items.

Figure 11:
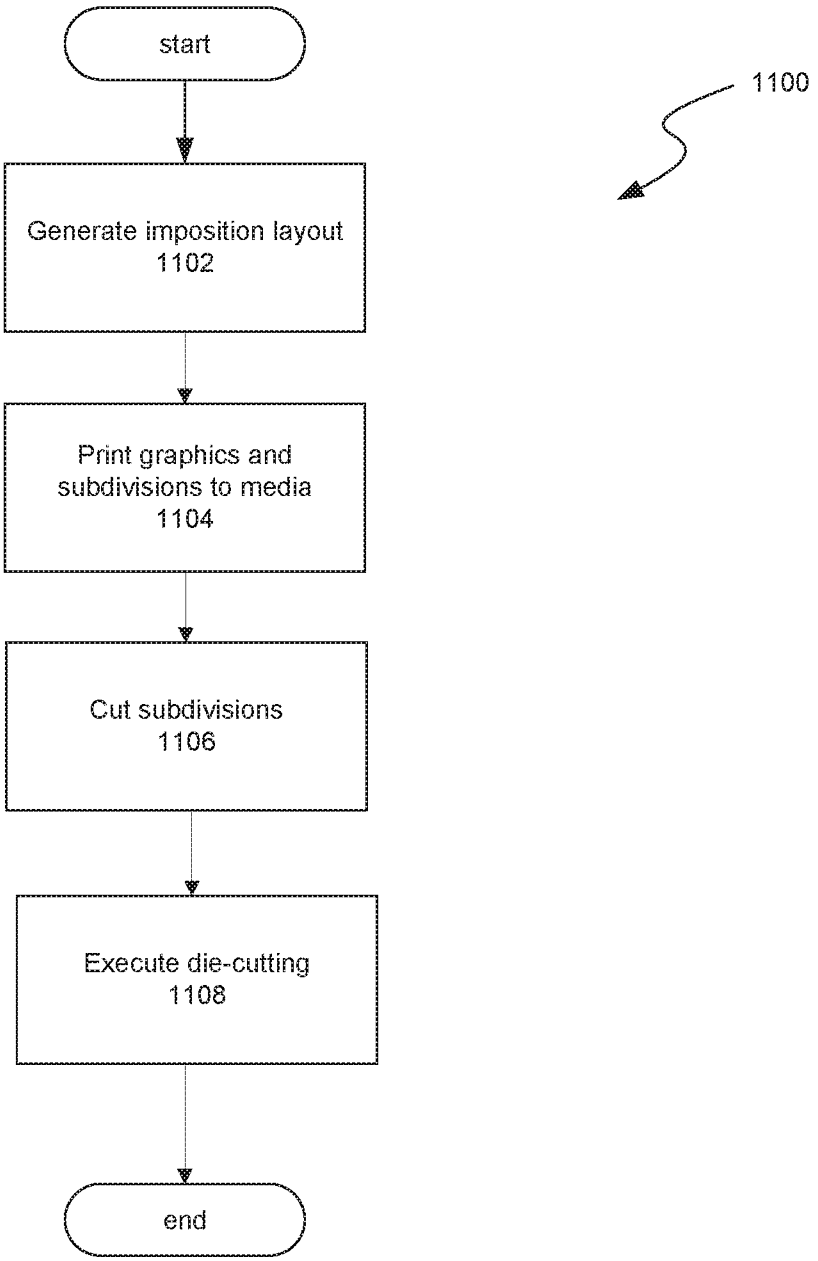
FIG. 11 is a diagram illustrating a process used in some implementations for generating executing print orders.

FIG. 11 is a diagram illustrating a process 1100 used in some implementations for generating executing print orders. The imposition scheme generates printer instructions that include automatically adding margins to dies and treating them as cut lines. In print orders that include multiple print objects, the schemes further place multiple dies on layouts together while maintaining individual print object positions. In some embodiments, printing marks are added to the layout for cutting devices to scan (e.g. barcodes) or for cutting device operators (e.g. registration marks). For the initial cutting process, the imposition software might be able to add these marks automatically.

In step 1102, the platform generates an imposition layout that steps down a media size between a printing apparatus and a die-cutter via subdivision indicators. The subdivision indicators are printed on the media. The subdivision indicators are used by either a human operator or an automated machine registration protocol.

In step 1104, a printing apparatus prints graphics to a first media based on the imposition layout. The printer operates at a higher efficiency than the die-cutting and thus prints instructions for multiple die-cutting operations simultaneously on a single media sheet or portion of media roll.

In step 1106, a non-die cutting device generates a plurality of subdivisions from the media based on the subdivision indicators. Examples of non-die-based cutting are guillotine cutters, digital cutting tables, and laser cutters. In some embodiments, guillotine cutting is the most common way to cut down material to smaller sizes for further finishing like die cutting; however, digital cutting tables are also used to cut down material before die cutting. The subdivisions may be either symmetrical or asymmetrical based on the die-cutting operations plotted within each subdivision and/or whether the subdivision is to be discarded.

The subdivision cuts may include further instructions to be ordered in a way that is most efficient (e.g., where a given side of multiple subdivisions may be cut simultaneously this is preferable to individually cutting each subdivision). For example, in FIG. 10, it is most efficient to make the 1004A subdivision cut before the 1004B cut because each cut will extend the full length or width of the media.

In step 1108, the remaining subdivisions are processed by the respective die-cutter(s). Where multiple die cutters are used, the associated subdivisions are sent to those die-cutting devices. In some embodiments, many subdivisions are stacked on top one another and a die-cutter performs a cut on the entire stack simultaneously (e.g., a high-die).

Figure 12:
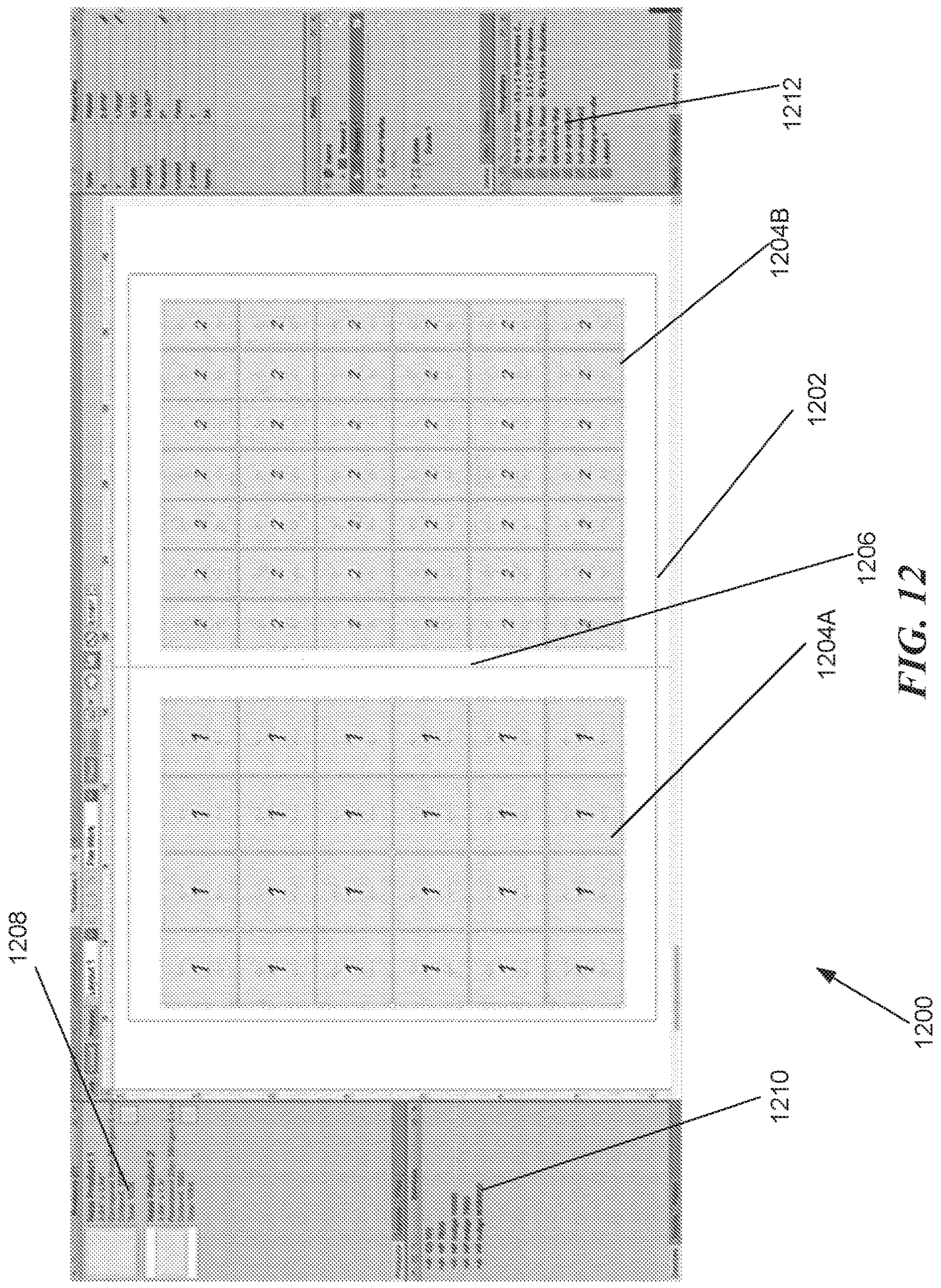
FIG. 12 is a screenshot of an imposition graphic user interface.

FIG. 12 is a screenshot of an imposition graphic user interface 1200. Depicted is an imposition scheme 1202 that makes use of two separate dies 1204A, B divided by a single asymmetric subdivision indicator 1206. The interface further includes a portion describing the products required by the print order 1208, a portion describing the available printing apparatus for the given order 1210, and a portion describing the available templates of die-cutters 1212.

The available die-cutters 1212 may include imposition templates that are combinations of real dies that are pre-imposed and require a predetermined subsection of the media.

Figure 13B:
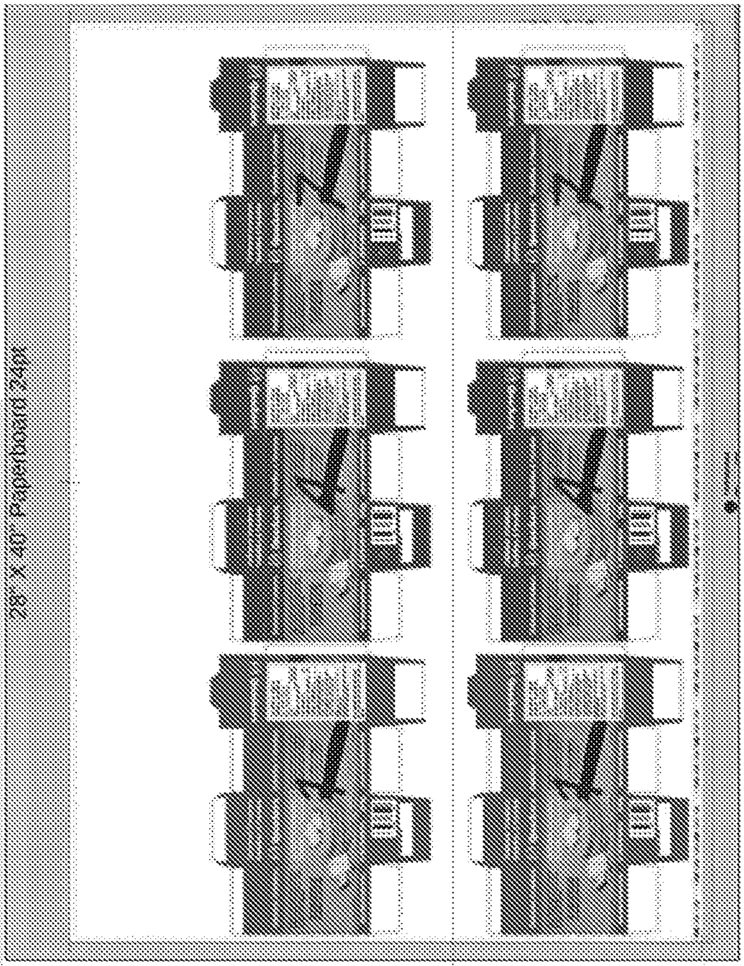
FIGS. 13A and 13B are screen shots of a second embodiment of a die and an imposition layout using subdivisions respectively as appearing in a graphic user interface.
Figure 13A:
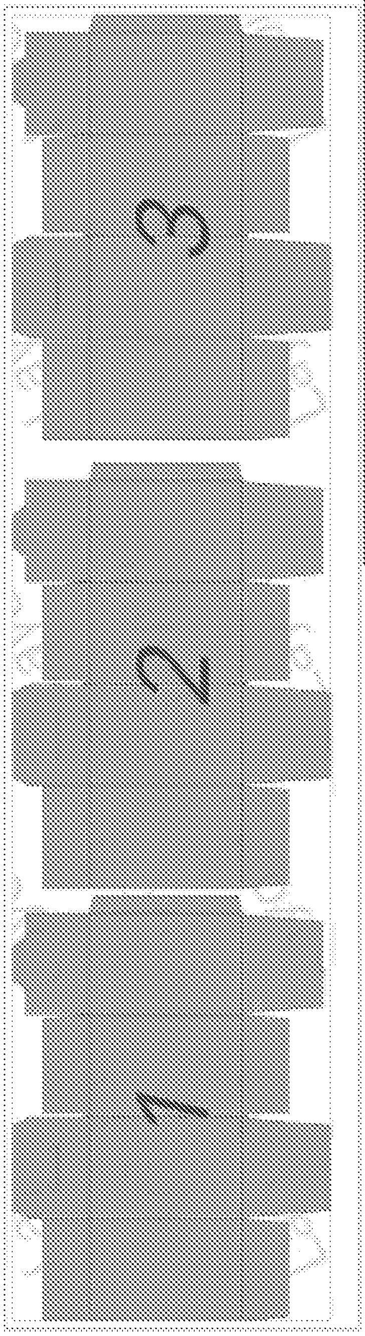

FIGS. 13A and 13B are screen shots of a second embodiment of a die and an imposition layout using subdivisions respectively as appearing in a graphic user interface. The figures portray a 3-up die for a box carton that is imposed once in each of two subdivisions.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

The invention claimed is:

1. A method of industrial print job imposition that employs cutters and media comprising:

receiving a print order including a requisite number of print products; receiving a specification of available equipment, the specification including characteristics of available cutters associated with the print products in the print order and characteristics of available printing apparatus;

generating a plurality of planning schemes, each planning scheme combining a printing apparatus and a cutter from the specification of available equipment;

ranking the plurality of planning schemes based on a predicted efficiency based on the specification of available equipment and respective printing apparatus and cutters, wherein said ranking is based on a predicted time expenditure based on data included in the specification of available equipment;

selecting at least one of the plurality of planning schemes, and generating for the selected planning scheme a plurality of imposition schemes that each include a packing alignment of the requisite number of print products to an exemplar media sheet, each of the plurality of imposition schemes including media subdivisions plotted out to the exemplar media sheet, and ranking the plurality of imposition schemes based on a predicted efficiency based on the specification of available equipment and the respective packing alignment.

2. The method of claim 1, wherein the plurality of imposition schemes includes at least one imposition scheme that includes a packing alignment of the requisite number of print products to the exemplar media sheet, the imposition scheme including one or more media subdivisions plotted out to the exemplar media sheet based on a first cutter device operation, wherein at least one media subdivision includes a second cutting operation instruction of a second cutter corresponding to a media size configured for the second cutter.

3. The method of claim 1, wherein:

generating the plurality of imposition schemes includes at least one imposition scheme including media subdivisions plotted out to the exemplar media sheet where:

a first media subdivision of the exemplar media sheet includes a cutting operation instruction associated with a first cutter; and a second media subdivision of the exemplar media sheet includes a cutting operation instruction associated with a second cutter.

4. The method of claim 1, further comprising:

generating the plurality of imposition schemes includes at least one imposition scheme including media subdivisions plotted out to the exemplar media sheet where:

a first media subdivision of the exemplar media sheet includes a die-cutting operation instruction associated with a first cutter; and a second media subdivision of the exemplar media sheet that is designated as scrap material or includes a print item that is cut via a non-die cutting operation.

5. The method of claim 2, wherein the one or more media subdivisions are non-symmetrical subdivisions, wherein each non-symmetrical subdivision is sized relative to a cutting operation instruction performed on a respective subdivision.

6. A method of industrial print job imposition that employs cutters and media comprising:

receiving a print order including a requisite number of print products; receiving a specification of available equipment, the specification including characteristics of a plurality of available cutters associated with the print products in the print order and characteristics of a plurality of available printing apparatus;

identifying a first printing apparatus of the plurality of available printing apparatus and a first cutter of the plurality of available cutters;

generating a first planning scheme and a first imposition scheme based on the first printing apparatus and the first cutter, wherein, when executed, the planning scheme and imposition scheme comprise print instructions to complete the print order; and ranking the first planning scheme and the first imposition scheme against a plurality of other planning and imposition schemes based on a predicted efficiency based on the specification of available equipment, said ranking based on a converted estimated cost of labor, materials, and equipment operation.

7. The method of claim 6, wherein the first imposition scheme calls for subdividing an exemplar media sheet using one or more cutting devices selected from the group consisting of: die-cutters, guillotine cutters, digital cutting tables, laser cutters, roll slitters, X/Y cutters, and combinations thereof.

8. The method of claim 7, wherein the first imposition scheme calls for use of an imposition template featuring a combination of pre-imposed dies corresponding to a predetermined subsection of the media sheet.

9. The method of claim 6, wherein said identifying further includes identifying a second cutter of the plurality of available cutters, and the first planning scheme and first imposition scheme include implementation of the first cutter and the second cutter in asymmetrical subdivisions of an exemplar media sheet.

10. A system of industrial print job imposition that employs cutters and media comprising:

a processor;

a display;

a memory including instructions that when executed, cause the processor to:

receive a print order including a requisite number of print products;

receive a specification of available equipment, the specification including characteristics of available cutters associated with the print products in the print order and characteristics of available printing apparatus;

generate a plurality of planning schemes, each planning scheme combining a printing apparatus and a cutter from the specification of available equipment;

rank the plurality of planning schemes based on a predicted efficiency based on the specification of available equipment and respective printing apparatus and cutters, said rank based on a predicted efficiency of a prioritization focus; and render a ranked list of planning schemes on the display.

11. The system of claim 10, the memory further including instructions that when executed, cause the processor to additionally:

for at least one selected planning scheme, generate an imposition scheme that includes a packing alignment of the requisite number of print products to an exemplar media sheet, the imposition scheme including media subdivisions plotted out to the exemplar media sheet, wherein a first media subdivision includes a cutting operation instruction of the first cutter and the first media subdivision corresponds to a media size configured for the first cutter.

12. The system of claim 10, the memory further including instructions that when executed, cause the processor to additionally:

select a first planning scheme;

generate a plurality of imposition schemes that each include a packing alignment of the requisite number of print products to an exemplar media sheet, each of the plurality of imposition schemes including media subdivisions plotted out to the exemplar media sheet, wherein each media subdivision of each of the plurality of imposition schemes includes a cutting operation instruction; and rank the plurality of imposition schemes based on a predicted efficiency based on the specification of available equipment and the respective packing alignment.

13. The system of claim 10, the memory further including instructions that when executed, cause the processor to additionally:

generate an imposition scheme that includes a packing alignment of the requisite number of print products to an exemplar media sheet, the imposition scheme including media subdivisions plotted out to the exemplar media sheet where:

a first media subdivision of the exemplar media sheet includes a cutting operation instruction associated with the first cutter; and a second media subdivision of the exemplar media sheet includes a cutting operation instruction associated with the second cutter.

14. The system of claim 10, the memory further including instructions that when executed, cause the processor to additionally:

generate an imposition scheme that includes a packing alignment of the requisite number of print products to an exemplar media sheet, the imposition scheme including media subdivisions plotted out to the exemplar media sheet where:

a first media subdivision of the exemplar media sheet includes a first cutting operation instruction associated with a first cutter; and a second media subdivision of the exemplar media sheet that is designated as scrap material or includes a print item that is cut via a second cutting operation associated with a second cutter.

15. The system of claim 12, wherein the first planning scheme further combines a first cutting device configured to subdivide media associated with a first printing apparatus into media having a media size corresponding to a second cutter.

16. The system of claim 10, wherein the media subdivisions are non-symmetrical subdivisions, wherein a size of each non-symmetrical subdivision is relative to a cutting operation instruction performed on a respective subdivision.

17. A method comprising:

receive a product order including a requisite number of work pieces; receiving a specification of available equipment, the specification including characteristics of available cutters associated with the work pieces in the product order;

generating a planning scheme that combines a media size and a cutter from the specification of available equipment; and generating an imposition scheme that includes a packing alignment of the requisite number of work pieces to an exemplar media sheet, the imposition scheme including media subdivisions plotted out to the exemplar media sheet, wherein each media subdivision of each of the plurality of imposition schemes includes a cutting operation instruction.

18. The method of claim 17, further comprising:

generating an imposition scheme that includes a packing alignment of the requisite number of print products to an exemplar media sheet, the imposition scheme includes media subdivisions plotted out to the exemplar media sheet based on a first cutter device operation associated with a first cutter, wherein at least one media subdivision includes a die-cutting operation instruction of a second cutter corresponding to a media size configured for the second cutter.

19. The method of claim 17, wherein the planning scheme is a first planning scheme of a plurality of planning schemes, the method further comprising:

ranking the plurality of planning schemes based on a predicted efficiency based on the specification of available equipment and respective printing apparatus and cutters.

20. The method of claim 17, further comprising:

generating an imposition scheme that includes a packing alignment of the requisite number of print products to an exemplar media sheet, the imposition scheme including media subdivisions plotted out to the exemplar media sheet where:

a first media subdivision of the exemplar media sheet includes a first cutting operation instruction associated with a first cutter; and a second media subdivision of the exemplar media sheet includes a second cutting operation instruction associated with a second cutter.

21. The method of claim 17, wherein the media subdivisions are non-symmetrical subdivisions, wherein a size of each non-symmetrical subdivision is relative to a cutting operation instruction performed on a respective subdivision.

22. A system of industrial print job imposition that employs cutters and media comprising:

a processor;

a display;

a memory including instructions that when executed, cause the processor to:

receive a print order including a requisite number of print products;

receive a specification of available equipment, the specification including characteristics of available cutters associated with the print products in the print order and characteristics of available printing apparatus;

generate a plurality of planning schemes, each planning scheme combining a printing apparatus and a cutter from the specification of available equipment;

rank the plurality of planning schemes based on a predicted efficiency based on the specification of available equipment and respective printing apparatus and cutters, said rank based on a predicted time expenditure based on data included in the specification of available equipment; and render a ranked list of planning schemes on the display.

23. The system of claim 10, wherein the predicted efficiency of the prioritization focus corresponds to statistics associated with the plurality of planning schemes.

24. The system of claim 23, wherein the statistics for each planning scheme are based on the specification of available equipment.

25. The system of claim 24, wherein the rank is further based on a predicted time expenditure.

26. The system of claim 25, wherein the predicted time expenditure is based on historical data included in the specification of available equipment.

27. The system of claim 10, wherein the prioritization focus is elected by a user.

28. The system of claim 10, wherein the prioritization focus comprises:

a cost, a time, or a combination thereof; and the user elects the prioritization focus by selecting a sorting rank feature from the cost, a run time, a waste, a sheet usage, a run length, a layout count, or a combination thereof.

* * * * *